United States Patent [19]
Grzesiak

[11] Patent Number: 5,347,702
[45] Date of Patent: Sep. 20, 1994

[54] METHOD OF PRODUCING A TRANSMISSION BRAKE BAND

[75] Inventor: Anthony J. Grzesiak, Sauk Village, Ill.

[73] Assignee: Borg-Warner Automotive Transmission & Engine Components Corporation, Sterling Heights, Mich.

[21] Appl. No.: 79,629

[22] Filed: Jun. 18, 1993

Related U.S. Application Data

[60] Division of Ser. No. 977,756, Nov. 19, 1992, Pat. No. 5,263,557, which is a continuation-in-part of Ser. No. 798,212, Nov. 26, 1991, abandoned, which is a continuation-in-part of Ser. No. 546,161, Jun. 28, 1990, Pat. No. 5,078,237.

[51] Int. Cl.$^5$ .............. B23P 11/02; B23P 15/18
[52] U.S. Cl. .................. 29/511; 29/233; 29/513; 29/DIG. 3
[58] Field of Search ............. 29/233, 243, 519, 432.1, 29/432.2, 509, 511, 513, 521, DIG. 1, DIG. 3, 469.5; 72/372, 457; 188/77, 249, 250 B, 250 F, 250 H, 259; 192/80, 107 T; 403/283, 285; 156/91

[56] References Cited

U.S. PATENT DOCUMENTS

| 1,590,104 | 6/1926 | Manning . |
| 1,706,635 | 3/1929 | Smith ........................ 29/233 X |
| 1,720,765 | 7/1929 | Smith . |
| 1,759,934 | 5/1930 | Chanter . |
| 2,122,557 | 7/1938 | Canter ..................... 29/243.519 X |
| 2,139,590 | 12/1938 | Jessop . |
| 2,243,923 | 6/1941 | Swanstrom ................. 29/513 X |
| 3,015,682 | 1/1962 | Cheski . |
| 3,367,466 | 2/1968 | Lang . |
| 3,399,749 | 9/1968 | Baule . |
| 3,732,954 | 5/1973 | Heid . |
| 3,747,713 | 7/1973 | Victory ...................... 188/259 |
| 3,811,542 | 5/1974 | Hamrick et al. . |
| 3,893,225 | 7/1975 | Hamrick et al. . |
| 3,909,919 | 10/1975 | Miyabayashi et al. ......... 29/509 X |
| 4,053,032 | 10/1977 | McDonald . |
| 4,157,746 | 6/1979 | Body . |
| 4,159,049 | 6/1979 | Merz . |
| 4,363,385 | 12/1982 | Schlanger ................ 192/107 T X |
| 4,456,100 | 6/1984 | Manaki . |
| 4,585,098 | 4/1986 | Pike . |
| 4,602,706 | 7/1986 | Blinks et al. . |
| 4,611,381 | 9/1986 | LaBarge et al. . |
| 4,757,880 | 7/1988 | Grzesiak . |
| 4,787,483 | 11/1988 | Stefanutti . |
| 5,067,227 | 11/1991 | Tanaka ..................... 29/469.5 X |

FOREIGN PATENT DOCUMENTS

| 1248884 | 3/1972 | Canada . |
| 467771A | 1/1992 | European Pat. Off. ............ 29/233 |
| 2340446 | 4/1974 | Fed. Rep. of Germany . |
| 9111635 | 8/1991 | PCT Int'l Appl. ............... 29/233 |

Primary Examiner—Peter Dungba Vo
Attorney, Agent, or Firm—Greg Dziegielewski

[57] ABSTRACT

An improved transmission brake band (10) and a method of forming the same has an improved reaction bracket (20) formed as an upraised dome (36) surrounding a reaction opening (32). An insert member (42), having a volcano-type body (44) integrally formed with a peripheral flange (46) is engaged with the dome (36) and opening (32) so that the body (44) is positioned in the opening (32) and the flange (46) is received by the dome (36).

7 Claims, 2 Drawing Sheets

METHOD OF PRODUCING A TRANSMISSION BRAKE BAND

This is a divisional of copending application Ser. No. 07/977,756 filed on Nov. 19, 1992 now U.S. Pat. No. 5,263,557 which is a continuation-in-part of Ser. No. 07/798,212 filed Nov. 26, 1991 now abandoned, which is a continuation-in-part of Ser. No. 546,161 filed Jun. 28, 1990 now U.S. Pat. No. 5,078,237.

TECHNICAL FIELD

This invention disclosed herein relates to a transmission brake band utilized in a vehicle automatic transmission wherein the bands encompass one or more clutch drums and, under the influence of suitable hydraulic controls, effect gear changes and control the direction of rotation of the output or drive shaft from the transmission.

BACKGROUND OF THE INVENTION

In conventional vehicle automatic transmissions of the torque converter type, a drive shaft extends from the torque converter into the transmission housing to a unit having one or more clutch drums around which are arranged either single-wrap or double-wrap brake bands. It is the function of the brake band, through the function of suitable hydraulic controls to effect gear changes and also control the direction of rotation of the output shaft from the transmission to the differential for the driving wheels of the vehicle.

The present invention is an improvement in the anchor or reaction bracket of a transmission brake band and will be described in an embodiment intended to be illustrative and is not intended to be limiting upon the use of this invention with transmission brake bands of all designs and styles.

Single-wrap brake bands are currently available in two distinct styles. The most commonly known single-wrap brake band is usually formed from a strip of sheet steel or similar material, having at its ends brackets formed from separate forgings, castings or stampings. The brackets are suitably secured to the strap of material by spot welding or similar methods as shown in U.S. Pat. No. 3,732,954. More recently, a unitary single-wrap brake band has been designed which utilizes a single piece of material wherein the brackets are extruded or formed from double thicknesses of the base metal at the ends of the strap member. An example of a brake band of this type of structure is disclosed in U.S. Pat. No. 5,078,237 issued from the grandparent '161 application of this application.

Regardless of how the brake band and bracket members are formed, it is a requisite that each brake band have an actuation or apply end for receiving an apply piston and a reaction or anchor end which is operatively connected to a reaction member located in the transmission. Various types of automatic transmissions utilize different types of reaction members. Some reaction members may be of the tangential type which comprise a stationary plunger or stop member acting against the anchor end of the brake band, while other reaction members may be the reaction pin type where the pin extends perpendicular to the clutch drum and strap member and extends into a reaction opening located in the anchor bracket of the brake band.

Where a reaction pin is used as the reaction member in the transmission band, a "volcano" type reaction bracket is commonly provided to engage the reaction pin. A typical volcano bracket consists of an extruded opening extending radially outwardly from the reaction bracket of the band. Alternatively, a bushing secured to the bracket may have a reaction opening formed therein to receive the free end of the reaction pin, thus providing the anchored end of the brake band during use of the band in the automatic transmission. The opposite or apply end of the band is provided with an apply bracket for engaging the end of the apply plunger in the transmission that is hydraulically controlled to urge the band ends together and tighten the brake band around the clutch drum, thus stopping the rotation of the drum or otherwise altering the rotation of the drum or other member to change the gear ratio or alter the direction of rotation of the output shaft. Due to the close tolerances required for proper function between the free end of the reaction pin and the opening of the volcano, many problems have been encountered in which the volcano opening fails prematurely during testing or operation of transmission. For instance, if the reaction pin is not fully engaged with the volcano opening the open edges of the volcano may chip, splinter, and crack.

The '237 patent approaches the stress failure problems of such volcano brackets by providing a single piece brake band with an anchor embossment extruded from a double thickness of the strap material to produce a volcano type reaction bracket at one end of the brake band. The strap material is folded upon itself to form the double-layer and the volcano opening is formed by piercing the double layer of material to extrude the layers and form a tapered opening. The two layers of strap material are then secured together by clinch fastening, spot welding or other adequate means.

While the extruded volcano opening has provided for enhanced strength characteristics and has significantly reduced the number of stress failures in such volcano anchor brackets, it remains desirable to further reduce the risk of failure of volcano-type reaction openings. Problems with stress fractures and failures are still encountered, especially in situations where the reaction pin is not fully inserted through the opening and forces are exerted at the upraised edges of the opening.

Therefore, it is an object of this invention to provide a reaction bracket having enhanced strength characteristics to overcome the possibility of premature failures of the brake band. The present invention achieves this goal by increasing the strength of the bracket and reinforcing the volcano so that premature failure of the bracket is quantitatively lessened.

BRIEF DESCRIPTION OF THE INVENTION

The present invention relates to an improved anchor bracket for use with automatic transmission brake bands. The bracket includes a prestressed domed portion having a reaction opening which is formed by punching or piercing the bracket material. A preformed volcano-style insert is retained within the dome portion. The bracket of the present invention is herein described generally with regard to its incorporation with a single piece brake band, however, it is envisioned that the bracket of this invention may be incorporated into any brake band design. For the purposes of simplicity, the present invention will be described as used with a single strip of suitable metallic band material wherein the prestressed dome portion is integrally formed therefrom.

In preparations for forming the brake band of the present invention, a single strap of suitable metallic band material is provided. One end of the strap is formed into the apply bracket and is bent upwardly and rearwardly flat over onto itself to form a double thickness of material at the one end of the strap. The opposed end of the strap is prestressed downwardly to form a domed area in the strap. A reaction opening is then punctured or pierced through the prestressed dome. A separate insert member is formed, having an extruded volcano-type body with a surrounding flange. The volcano-type body is inserted through the reaction opening of the strap so that the flange seats in the prestressed dome portion. The combination dome and insert is then folded flat back onto the strap member to generally form a double thickness and is secured by any acceptable means. If desired, a structural adhesive may be applied to the insert before the insert is secured between the dome and the strap member. There is no extrusion of the layers of the strap material. Rather, the periphery of the strap material which forms the reaction opening after the punching step is generally aligned in parallel with the curvilinear surface of the remainder of the band. The dome portion surrounding the reaction opening places the strap material in a generally perpendicular relationship to the volcano-type body as it is inserted in the reaction opening. Thus, the reaction opening is not a volcano and is not created form upwardly bent, stressed or extruded portions of the band material.

The invention will be more readily understood after reading the following best mode for carrying out the invention with reference to the accompanying drawings.

BEST MODE FOR CARRYING OUT THE INVENTION

Referring now with particularity to the drawings, the present invention will be described in detail with regard to FIGS. 1–5 which all reference a one-piece single-wrap brake band. However, it is not intended that this description of the invention in use with a single-wrap one-piece brake band be necessarily limiting upon the envisioned range of embodiments for the present invention.

Figure 1:
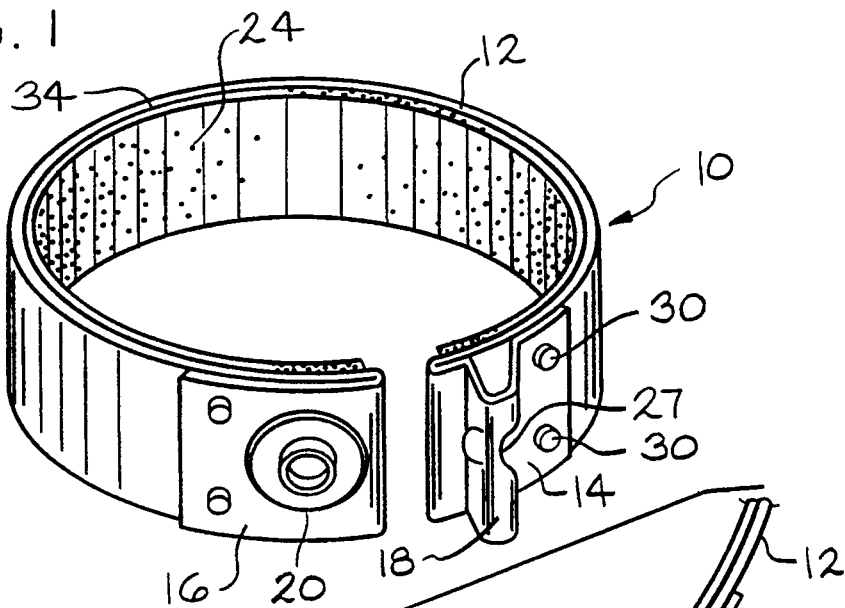
FIG. 1 is a perspective view of the transmission brake band of the present invention.
Figure 2:
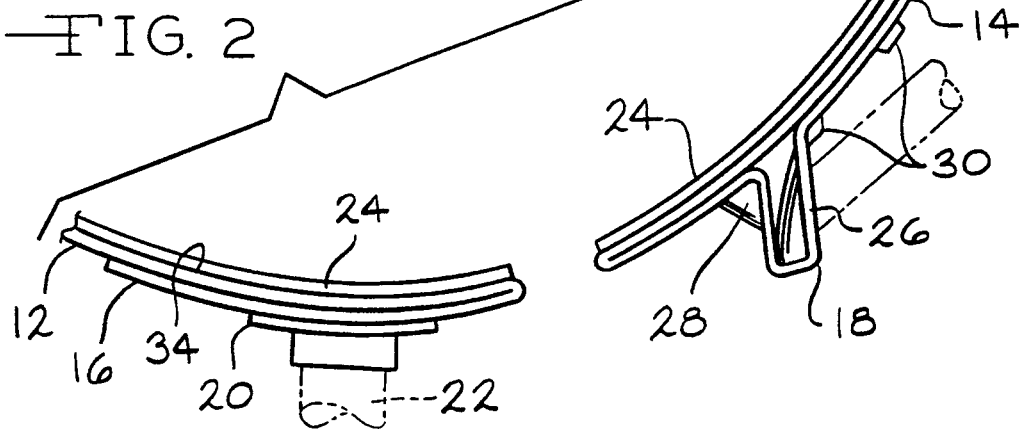
FIG. 2 is a partial end elevational view of the transmission brake band of FIG. 1.

Referring now to FIGS. 1 and 2, the present invention discloses a one-piece brake band, generally designated by the reference numeral 10, for use in a vehicle automatic transmission (not shown), which is formed from an elongated strap of material defining a curved band 12 of determinate length. The opposed ends 14, 16 of the strap 12 are folded over and rearwardly flat back upon the strap 12 to create bracket members 18, 20, which are designed to engage an apply piston (shown in ghost in FIG. 2) and a reaction pin 22 (shown in ghost in FIG. 2), respectively. The brake band 10 further includes a friction lining 24 suitably secured thereto by an acceptable method of adhesion.

Figure 3:
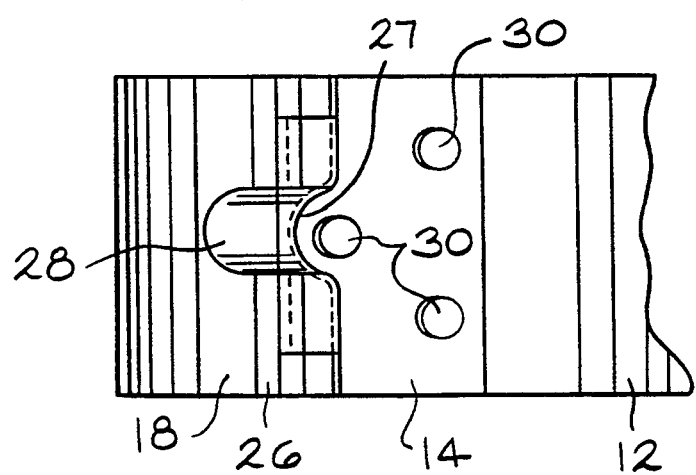
FIG. 3 is a top plan view of the apply bracket of the transmission brake band of FIG. 1.

Referring now to FIGS. 2 and 3, the apply bracket member 18 is formed by folding the end 14 into a folded ridge 26 having a strengthening rib 28 on the side of the fold that is opposed to and located below the contact point for the apply piston or pin. The folded ridge 26 preferably includes a depressed area intended to form a pocket 27 in the central area of the side opposite the strengthening rib 28. The depressed area or pocket 27 is adapted to engage the end of the apply piston acting in a generally tangential direction to the clutch drum. The end 14 with ridge 26 and strengthening rib 28 are, preferably, folded flat back over the strap 12 and secured to the strap by commonly accepted methods such as clinch fastening 30.

Figure 4:
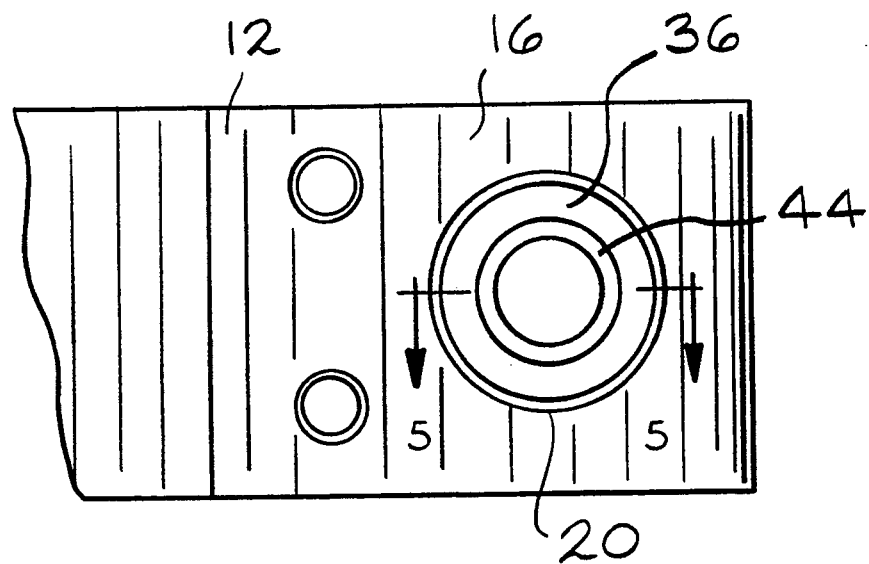
FIG. 4 is a top plan view of the reaction bracket of the transmission brake band of FIG. 1; and, FIG. 5 is a sectional view taken along lines 5—5 of FIG. 4.
Figure 5:
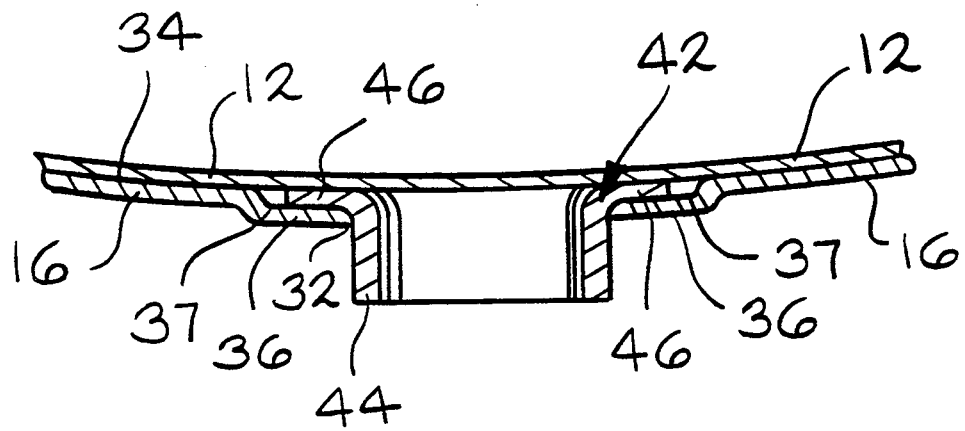

Referring now to FIGS. 4 and 5, the opposed end 16 forms the bracket reaction member 20. A reaction pin opening 32 is punched or pierced through the strap material and an annular peripheral prestressed dome 36 is formed surrounding the opening 32. The end 16 and domed portion 36 is then folded rearwardly back toward the surface of the strap member 12. An insert member 42, separately formed to create a volcano-type body 44 with surrounding integral flange 46 is placed adjacent the domed portion 36 of the end 16 so that the body 44 extends through the reaction pin opening 32. If desired, a structural adhesive may be applied to the insert member 42 to assist in retaining the insert member 42 in position within the domed portion 36 of the end 16. The end 16 is then secured to the strap member 12 in a commonly accepted manner. The surface 37 of the dome 36 immediately proximate the reaction opening 32 is preferably aligned in a generally parallel relationship with the curvilinear surface of the strap member 12. Thus the layer of strap material that surrounds the volcano-type body 44 lies generally perpendicular to the axis of the anchor pin 38 and, therefore, provides for enhanced bracket 20 strength against the forces applied by the pin 38 to the volcano-type body 44 and the reaction opening 32. The reaction bracket member 20 is, preferably, fastened to the strap 12 by clinched fasteners 40 which are similar to the fasteners 30 utilized with the apply bracket. Although clinched fasteners are shown, the layers could also be spot welded together if desired.

The reaction bracket of the present invention provides for greater latitude in positioning of the reaction pin within the reaction opening and further, provides for greater strength in retaining the reaction pin in position without premature failure of the brake band. The construction of this invention may be utilized with both uniband and standard transmission band construction. It is intended that variations of the embodiments disclosed herein may be incorporated with reaction or apply brackets for transmission bands without departing from the scope and content of the following claims.

I claim:

1. A method of producing a transmission brake band (1) from an elongated strip of material, wherein the strip of material forms a friction lined strap member (12), having a first end (14) and an opposed second end (16), the strap member (12) defining a generally annular interior circumference (34) and having an apply bracket (18) located at the first end (14) of the strap member (12) and a reaction bracket (20) located at the opposed second end (16) of the strap member (12), comprising the steps of: folding the first end (14) of the strip of material back 180° over onto the strap (12) to form an apply bracket (18); piercing the opposed end (16) of the strip of material to create a reaction opening (32) having a specified circumference; forming a prestressed dome portion (36) surrounding the reaction opening (32); positioning an insert member (42) having an upraised body portion (44) with an outside circumference mating with the specified circumference of the reaction opening (32); folding the end back 180° over onto the strap (12) to capture the insert member (42) between the strap (12) and the folded over end (16); applying a friction lining (24) onto the interior circumference (34) of the strap member (12); and forming the strap member (12) into a curved band (10).

2. The method of claim 1, wherein the surface of the dome (36) immediately surrounding the reaction opening (32) is formed in a generally parallel relationship with the interior surface (34) created by the strap member (12) and is generally perpendicular to the longitudinal axis of the body (44).

3. The method of claim 1, wherein the body (44) is integrally formed with a flat peripheral flange (46).

4. The method of claim 3, wherein the insert member (42) is positioned so that the body (44) engages the reaction opening (32) and the flange (46) is received by the dome portion (36) before the end (16) is folded back 180° over onto the strap (12).

5. The method of claim 1, further including the step of applying structural adhesive to the insert member (42) as the member is positioned in the reaction opening (32) and before the end (16) is folded back 180° over onto the strap (12).

6. The method of claim 1 further including the step of forming an apply bracket (18) from the end (14) of the strip of material prior to the step of folding the end (14) back 180° over onto the strap member (12).

7. The method of claim 1 further including the step of forming an apply bracket (18) from the end (14) and the strap member (12) after the step of folding the end (14) back 180° over onto the strap member (12).

* * * * *